Oct. 19, 1943.   J. H.-P. ANDREWS   2,332,188
FILTER
Filed Oct. 21, 1941
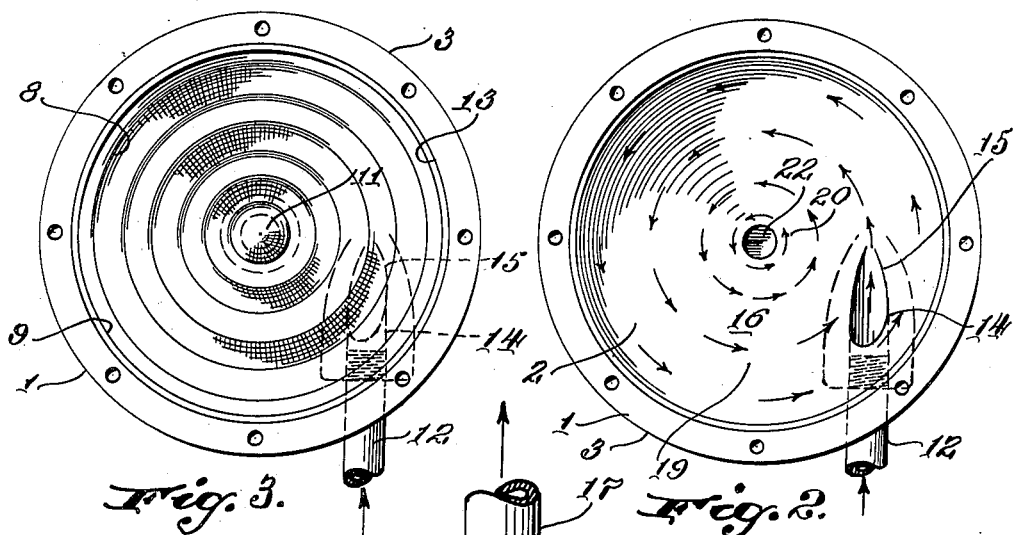
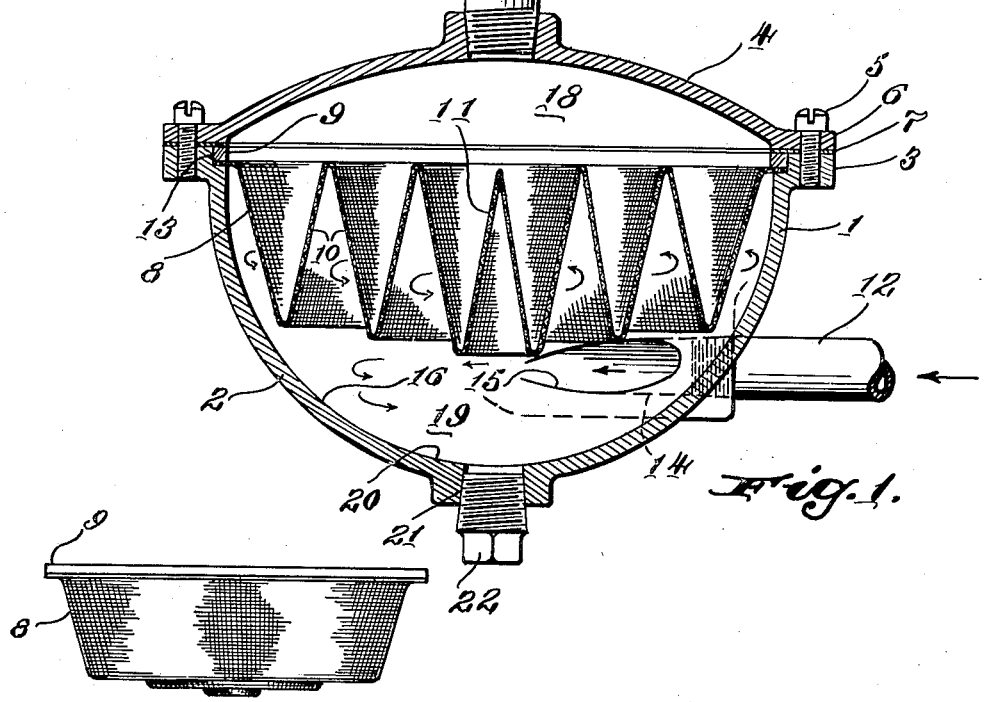
Inventor
JOHN H.-P. ANDREWS
WITNESS Patented Oct. 19, 1943

2,332,188

UNITED STATES PATENT OFFICE 2,332,188

FILTER

John H.-P. Andrews, Baltimore, Md.

Application October 21, 1941, Serial No. 415,956

8 Claims. (Cl. 210—165)

The invention relates to a filter for the separation of solids and semi-solids from liquids as fuel oil, gasoline, lubricating oil and/or water, for which purposes it may be installed in the fuel oil supply line of an oil burner, in the oil or gasoline line of an internal combustion motor, in the lubricating oil line of such a motor or in a water supply pipe, being for these various purposes made in a suitable number of different sizes.

The filter of the invention is of the screen fabric type and it is an important feature of the invention that the screen is arranged in the form of a series of concentric channels, the liquid to be filtered being so introduced and deflected as to establish and maintain a vortex or rotary motion of the liquid in said channels and in contact with the screen, passing the liquid not only through but along the screen with a sweeping action whereby the particles of solid matter separated from the liquid are swept from the screen preventing or deferring the accumulation of such particles on the screen and the eventual more or less complete clogging of the screen. Preferably the liquid is introduced beneath the screen which separates the filter casing into upper and lower chambers, the liquid, as introduced, being not only circulated to form a vortex but preferably given an upward tendency toward the screen, the clear liquid being discharged from the casing above the screen most conveniently at the top center. The concentric arrangement need be only approximate.

In this way, according to the preferred arrangement, the force of gravity, i. e., the tendency of the solids to settle is utilized, together with the other forces involved in the above described operation, to separate the solids from the liquid and to accumulate the sediment in a sediment basin beneath the screen from which it is discharged by way of a drain or flush opening.

The concentric channel arrangement of the screen has the further advantage that it facilitates the efficient employment of a large screen area in a relatively small casing and this arrangement also contributes to the economical use of the screen fabric by forming it into a cone which is folded or pleated on lines drawn circumferentially of the cone to form the series of concentric channels suggested.

In the accompanying drawing I have illustrated a filter embodying the features of my invention in the preferred form.

In the drawing:

Fig. 1 is a vertical central section on the axis of the filter casing, showing the entire construction assembled.

Fig. 2 is a top plan view of the same drawn to a reduced scale.

Fig. 3 is a similar view with the cover removed, and

Fig. 4 is an elevation drawn to the scale of Figs. 1 and 2 showing the filter element removed.

Referring to the drawing by numerals, each of which is used to indicate the same or similar parts in the different figures, the construction shown comprises a casing 1, which is preferably circular in plan or of similar configuration. The said casing as shown consists of a bowl 2 of approximately hemispherical form, this bowl 2, in the form shown, is provided at its rim with a peripheral flange 3 to which is secured a similarly flanged cover 4 shown as of inverted dished form. The cover 4 is, in the form of the invention shown, secured by screws 5 or in any suitable manner, the contact between the cover flange 6 and the bowl flange 3 being perfected and rendered fluid tight by means of a gasket 7 or in any suitable manner.

The screen element 8, which is an important feature of the invention may be clamped between the cover 4 and the bowl 2 for which purpose it is provided with a circular frame or ring 9 to which the peripheral edge of the screen is secured. This ring, as shown, is seated in a groove 13 formed in the inner periphery of the upper edge of the bowl 2, this arrangement being preferred.

The screen 8, as already suggested, is arranged in the form of a series of concentric channels 10. Being formed by folding or pleating a conical screen it may also include a central conical portion 11, the details being subject to wide variation.

The general arrangement of the screen is preferably horizontal and the casing 1, as shown, is provided with an inlet passage or pipe 12 entering the bowl beneath the screen, the inner end of the pipe or passage is preferably eccentrically located or disposed in an approximately tangential direction as shown at 14. It is also regarded as of advantage to have the discharge opening upwardly disposed as indicated at 15.

The tangential direction of the inner end 14 of the supply pipe 12 combined with the spherical or similar contour of the wall 16 of the bowl 2 which tends to deflect the entering liquid to a circular path, imparts to the liquid a rotary tendency whereby a vortex or whirlpool action is established. The upward direction of the opening 15, of pipe 12 also has the effect of directing the vortex upwardly against the screen the circular motion of the liquid causing it to follow the channels 10 giving it a sweeping action in connection with the screen surfaces of channels 10 tending to remove from the screen the particles separated from the liquid and to defer or prevent clogging of the screen. Making the channels continuous would not change the principle of the invention.

In conformance with the preferred arrangement and the principles of operation stated the outlet or discharge opening by which the clear liquid leaves the filter, the same being indicated by reference character 17, is located in the cover 4 above the screen 8 which divides the casing horizontally into upper and lower chambers 18 and 19.

The lower portion of the bowl 2 as indicated by reference character 20 serves the function of a sediment bowl at the center of which is a drain opening 21 normally closed by a drain plug 22.

In the operation of the filter, as already pointed out, the liquid to be treated being introduced by way of the pipe or passage 12 into the lower chamber 19 and being withdrawn by way of passage 17 from the upper chamber 18 is given a circular motion directed upwardly into the channels 10 in which it circulates in contact with the screen 8 moving along the surface of the screen, thus tending to remove from the screen the particles separated from the liquid. The force of gravity thereafter assists in depositing these particles in or about the area 20 at the bottom of the bowl. The upward tendency of the liquid due to the location and arrangement of the inlet and discharge passages and the shape of the bowl contribute to the operation in that they tend to cause the incoming liquid to enter and follow the screen channels and to pass the liquid upwardly through the screen into the chamber 18 from which it is withdrawn by way of the discharge passage 17, the solid particles being separated from the liquid by the screen, to be removed therefrom by the vortex action of the liquid on the screen and permitted to settle to the bottom of the bowl, the action described also increasing the tendency to settle.

When sufficient sediment has accumulated, it is withdrawn from the opening 21 by removing the plug 22 and wholly or partially draining the bowl in accordance with the usual practice.

I have thus described a filter embodying the features of my invention, the description being specific and in detail in order that the manner of constructing, applying, operating and using the invention may be fully understood, however, the specific terms herein are used in a descriptive rather than in a limiting sense, the scope of the invention being defined in the claims.

What I claim as new and desire to secure by Letters Patent is:

1. A filter having a concentric casing, a screen in said casing dividing it into a plurality of chambers, said screen being arranged in the form of a plurality of approximately concentric channels, an inlet passage leading to one chamber and discharging on a path which is substantially tangent to one of said channels and a discharge passage leading from the other chamber.

2. A filter having a concentric casing, a screen in said casing dividing it into upper and lower chambers, said screen being arranged in the form of a plurality of approximately concentric channels, an inlet passage leading into the lower chamber and discharging on a path which is approximately tangent to the outer channels and a discharge passage leading from the upper chamber.

3. A filter having a concentric casing, a screen in said casing dividing it into upper and lower chambers, said screen being arranged in the form of a plurality of approximately concentric channels, an inlet passage leading into the lower chamber and discharging thereinto on a path which is approximately tangent to the outer channels and is also upwardly directed toward said screen and a discharge passage leading from the upper chamber.

4. A filter for the use in separating solid particles from liquid, said filter having a casing of approximately circular horizontal cross section and a strainer arranged in the form of approximately concentric channels and dividing the casing into upper and lower chambers, the lower chamber having an approximately tangential supply pipe for the liquid leading into said chamber and the upper chamber having a discharge pipe for the filtered liquid leading therefrom.

5. A filter for use in separating solid particles from liquid, said filter having a casing and a strainer arranged in the form of approximately concentric channels and dividing the casing into upper and lower chambers, the lower chamber having a supply inlet for the liquid discharging into said chamber on a path which is substantially tangential to an outer one of said channels, said inlet also having an upward tendency, said lower chamber having a circumferentially arranged deflection means opposite said supply pipe, the upper chamber having a discharge pipe for the filtered liquid leading from said chamber above said strainer.

6. A filter for use in the separation of solid particles from liquid, the same comprising an approximately hemispherical bowl and a removable cover therefor, a screen removably secured and separating the casing into upper and lower chambers, the screen being in the form of approximately concentric channels, an inlet pipe leading into the lower chamber and disposed in the direction of a tangent to one of said channels of said channels and a discharge pipe leading from the upper chamber.

7. A filter for use in the separation of solid particles from liquid, the same comprising an approximately hemispherical bowl and an inverted dished cover and a screen removably secured between the cover and bowl and separating the casing into upper and lower chambers, the screen being in the form of approximately concentric channels, an inlet pipe leading into the lower chamber and a discharge pipe leading from the upper chamber, the inlet pipe having its discharge end disposed in the direction of the length of said channels and approximately parallelled to an adjacent portion of the wall of said casing to circulate the liquid in the form of a vortex by contact with the chamber walls, the upper chamber having a discharge pipe leading therefrom.

8. A filter for use in the separation of solid particles from liquid, the same comprising a bowl having an approximately peripheral deflecting side wall portion and a top wall, a screen separating the casing into upper and lower chambers, the screen being in conical form having pleats forming the walls of a series of approximately concentric screen channels, an inlet leading into the lower chamber and a discharge opening leading from the upper chamber, the inlet being disposed in the direction of the length of adjacent portions of said channels and in a tangential direction as related to an adjacent portion of the wall of said casing to circulate the liquid in the form of a vortex.

JOHN H.-P. ANDREWS.